United States Patent [19]

Kawada et al.

[11] Patent Number: 4,883,360

[45] Date of Patent: Nov. 28, 1989

[54] METHOD AND APPARATUS FOR AUTOMATICALLY ADJUSTING WHITE BALANCE

[75] Inventors: Yukihiro Kawada; Yoshiaki Nakayama, both of Tokyo, Japan

[73] Assignee: Fuji Photo Film Co., Ltd., Kanagawa, Japan

[21] Appl. No.: 231,474

[22] Filed: Aug. 12, 1988

[30] Foreign Application Priority Data

Aug. 13, 1987 [JP] Japan .................................. 62-202509
Aug. 13, 1987 [JP] Japan .................................. 62-202510
Aug. 13, 1987 [JP] Japan .................................. 62-202511

[51] Int. Cl.$^4$ ............................................. G01J 3/46
[52] U.S. Cl. ................................................ 356/402
[58] Field of Search ................... 356/402, 400; 358/37; 364/508

[56] References Cited

U.S. PATENT DOCUMENTS 4,504,853 3/1985 Faroudja ................................ 358/37
4,646,754 3/1987 Seale .................................... 364/508

Primary Examiner—Leon Scott, Jr.
Attorney, Agent, or Firm—Birch, Stewart, Kolasch & Birch

[57] ABSTRACT

An automatic white balance adjusting method in which color difference signals ($E_R-E_Y$) and ($E_B-E_Y$) obtained by photographing an object are respectively integrated over the entire screen and the gains of red and blue signals are respectively controlled so that the resultant integration average values can be respectively identical with predetermined reference levels. In the method, when the respective color difference signals are integrated, only the weak color difference signals are selectively integrated. Also, there are set predetermined limits respectively to the gains of the red and blue signals.

8 Claims, 15 Drawing Sheets (A) PICTURE PATTERN (B) COLOR DIFFERENCE SIGNAL (ER − EY)

(C) COLOR DIFFERENCE SIGNAL (ER − EY) AFTER BLANKED (D) COLOR DIFFERENCE SIGNAL (ER − EY) AFTER SLICED

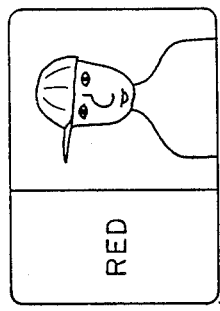
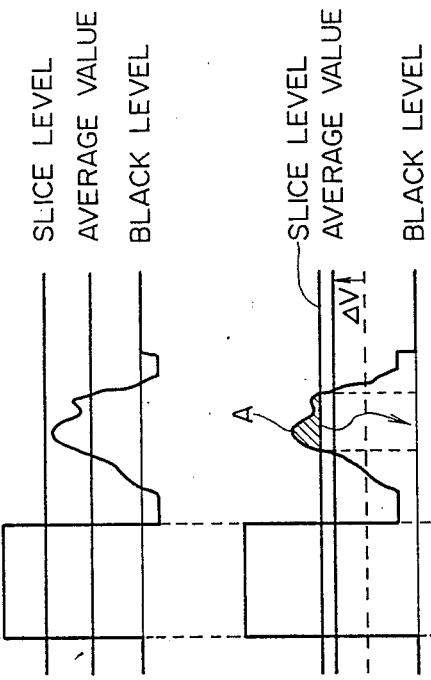
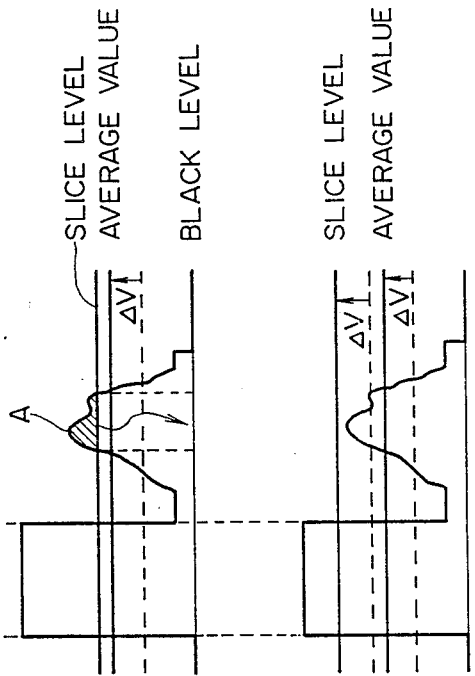
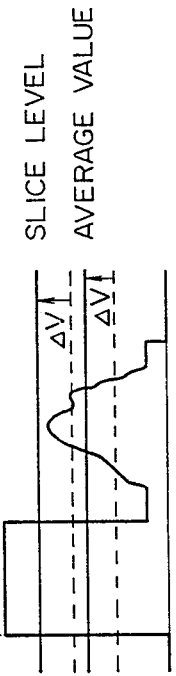
FIG. 4 (A) PICTURE PATTERN
FIG. 4 (B) COLOR DIFFERENCE SIGNAL (E$_R$-E$_Y$)
FIG. 4 (C) COLOR DIFFERENCE SIGNAL (E$_R$-E$_Y$) AFTER VARIATION OF COLOR TEMPERATURE (E$_R$-E$_Y$)
FIG. 4 (D) MODIFICATION OF SLICE LEVEL ACCORDING TO AVERAGE VALUE

METHOD AND APPARATUS FOR AUTOMATICALLY ADJUSTING WHITE BALANCE

BACKGROUND OF THE INVENTION

1. Field of the Invention

The present invention relates to method and apparatus for automatically adjusting white balance and, in particular, to method and apparatus for automatically adjusting white balance using an internal light measurement system.

2. Description of the Related Art

Conventionally, an automatic white balance adjusting method includes an external light measurement system and an internal light measurement system. In the external measurement system, a color temperature is measured by use of an external sensor and a control signal obtained from the measured color temperature is used to control the gains of red and blue signals, which is generally referred to as an open loop control. In this system, if the color temperature of the light that strikes on an object is different from the color temperature of the light incident upon the external sensor, then an error is produced to thereby provide a unnatural color tone. For example, when an exterior is photographed through a window from an illuminated room, since the interior light having a low color temperature strikes the external sensor, a control to make the color tone blue is effected so that the resultant image has a strong blue tone.

On the other hand, in the internal measurement system, since the light striking the object is used, a direct decision can be made and thus a suitable color tone can be obtained.

Now, description will be given here of the automatic white balance adjusting method according to the above-mentioned conventional internal measurement system in connection with FIG. 15. The light entering through a lens 10 is photoelectrically separated by an image pickup element 12 into red, green and blue signals ($E_R$, $E_G$, $E_B$). These signals ($E_R$, $E_G$, $E_B$) are respectively input through amplifiers 14, 16, 18 to a matrix circuit 20, where they are converted into a brightness signal $E_Y$ and color difference signals ($E_R-E_Y$), ($E_B-E_Y$) and are then input into an encoder 22. In the encoder 22, the color difference signals are DC/AC two-phase modulated by means of 3.58 MHz signals and are added with the brightness signal $E_Y$, and then are output as a video signal in the NTSC system.

On the other hand, the color difference signals ($E_R-E_Y$) and ($E_B-E_Y$) are respectively input to integrating circuits 24 and 26. In these circuits, the color signals on the entire screen are integrated and the average value of the integrations is then input to the respective negative inputs of differential amplifiers 28 and 30. To the respective positive inputs of the differential amplifiers 28 and 30, there is input a reference level from reference level setting means 32 and 34 which is the average value of the color difference signals ($E_R-E_Y$) and ($E_B-E_Y$) corresponding to the time when the average value of the colors o the entire screen indicates a grey color. The differential amplifier 28 amplifies the difference between the above-mentioned two input signals and then outputs to the amplifier 14 a gain control signal $R_{CONT}$ which is obtained from the difference amplification, thereby controlling the gain of a primary color signal $E_R$ which is amplified by the amplifier 14. Also, the differential amplifier 30 outputs to the amplifier 18 a gain control signal $B_{CONT}$ which is obtained by amplifying the difference between the above-mentioned two input signals, thereby controlling the gain of a primary color $E_B$ which is amplified by the amplifier 18. As a result, the primary color signals $E_R$, $E_B$ can be controlled so that the average value of the color difference signals ($E_R-E_Y$), ($E_B-E_Y$), on the entire screen coincides with the reference level.

In other words, the above-mentioned automatic white balance adjusting method is a control system based on a generally known fact that, when colors on the entire screen are average, a grey color is obtained (even when a general object is photographed, the color average on the entire screen provides the same result that is obtained when a white object is photographed.)

However, all objects cannot satisfy the above-mentioned supposition. An object with a blue sky and a blue sea for a background, or an object with a red wall for a background is an example of such objects. In this case, the integration (averaging) of colors on the entire screen results in a blue or red color, not a grey color. If the above-mentioned white balance adjustment is effected on such an object, then both blue and red colors turn into a grey color. This is an erroneous control which is generally referred to as a color failure.

Also, in the above-mentioned automatic white balance adjusting method, even when the color temperature with respect to the object is varied, the color of the object is adjusted to be the same color. This is truly preferable in that the thus adjusted color is coincident with a so called memory color of a human being (for example, even when a white object is slightly colored by illumination, the object is recognized as not colored but white); but, since the above-mentioned white balance adjustment is made at any color temperatures, when the color temperature is beyond a predetermined range, the resultant color provides an unnatural tone which is quite alien to the human sensitivity.

Further, for example, if while the white balance adjustment is being made on a reddish object the object itself is turned white suddenly, then the gain control signal $R_{CONT}$ is greatly varied, with the result that the amplifier 14, which is adapted to control the gain by means of the gain control signal $R_{CONT}$, controls the gain of the signal $E_R$ more than necessary (in the direction of a complementary color of a red color), thereby causing vibration (hunting) until the control signal settles down to an actual control value.

SUMMARY OF THE INVENTION

It is an object of the invention to provide an automatic white balance adjusting method and apparatus of an internal light measurement type which can eliminate or minimize an erroneous control or a color failure.

It is another object of the invention to provide an automatic white balance adjusting method and apparatus of an internal light measurement type which can control a more-than-necessary white balance adjustment and also can perform white balance adjustment having a characteristic closer to the sensitivity of a human being.

In order to achieve the above objects, according to the present invention, there is provided an automatic white balance adjusting method in which color difference signals ($E_R-E_Y$) and ($E_B-E_Y$) are respectively created from signals obtained by photographing an object, these color difference signals are respectively integrated over the entire screen, and the gains of red and blue signals are controlled such that the respective average values of the above integrations are identical with a predetermined reference level, characterized in that there is established a slice level used to detect strong color differences with respect to the above-mentioned respective color difference signals, and that, when the respective color difference signals include a strong color difference signal exceeding the above established slice level, a predetermined level representing a color difference signal weaker than the above-mentioned slice level or a level identical with the slice level is integrated in place of the strong color difference signal to thereby remove the strong color difference signal from the respective color difference signals.

Accordingly, when an average value of the entire screen is found by integrating the respective color difference signals $(E_R-E_Y)$ and $(E_B-E_Y)$ that are created from signals obtained by photographing an object, a color difference signal greater than a certain level (a slice level), (a strong color difference signal), is not integrated, but in place of the strong color difference signal a predetermined level representing a weaker color difference signal than the abovementioned slice level or a level identical with the slice level is integrated. In other words, even when the entire screen average of an original picture does not show a grey color, the average can be made approach to the grey color by integrating the information obtained by removing a strong color from the original picture, thereby eliminating an erroneous control or a color failure.

According to another aspect of the invention, there is provided an automatic white balance adjusting method in which color difference signals $(E_R-E_Y)$ and $(E_B-E_Y)$ are created respectively from signals obtained by photographing an object, these color difference signals are respectively integrated over the entire screen, and the gains of red and blue signals are controlled such that the respective average values are identical with a predetermined reference level, characterized in that there are established predetermined limits for the gains of the above-mentioned red and blue signals so that the gains of the red and blue signals can be controlled when a color temperature exceeds a predetermined range.

Accordingly, when the color temperature goes beyond the predetermined range, the gain of the red or blue signal can be controlled by the above-mentioned limit. In other words, when the color temperature is lower than the predetermined range, a color which is slightly reddish and has a warm tone can be reproduced, and on the contrary when the color temperature is higher, a bluish and cool color can be reproduced, so that a natural color tone can be provided.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein:

FIGS. 4(A) to (D) are respectively views used to explain a preferred method of setting up a slice level;

FIG. 5 is a view used to explain the moving range of the slice level or the like;

DETAILED DESCRIPTION OF THE INVENTION

Detailed description will hereunder be given of the preferred embodiments of method and apparatus for automatically adjusting white balance according to the present invention with reference to the accompanying drawings.

Figure 2:
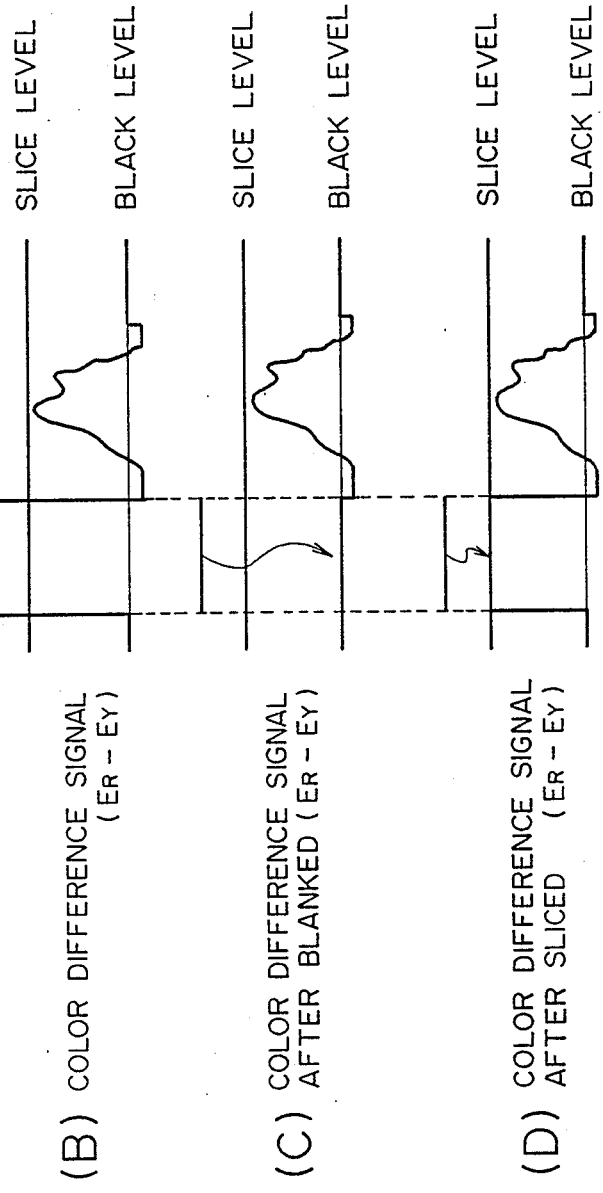
FIGS. 2(A) to (D) are respectively views used to explain the principles of the invention.

At first, we will describe the principles of the present invention with reference to FIG. 2.

Figure 8:
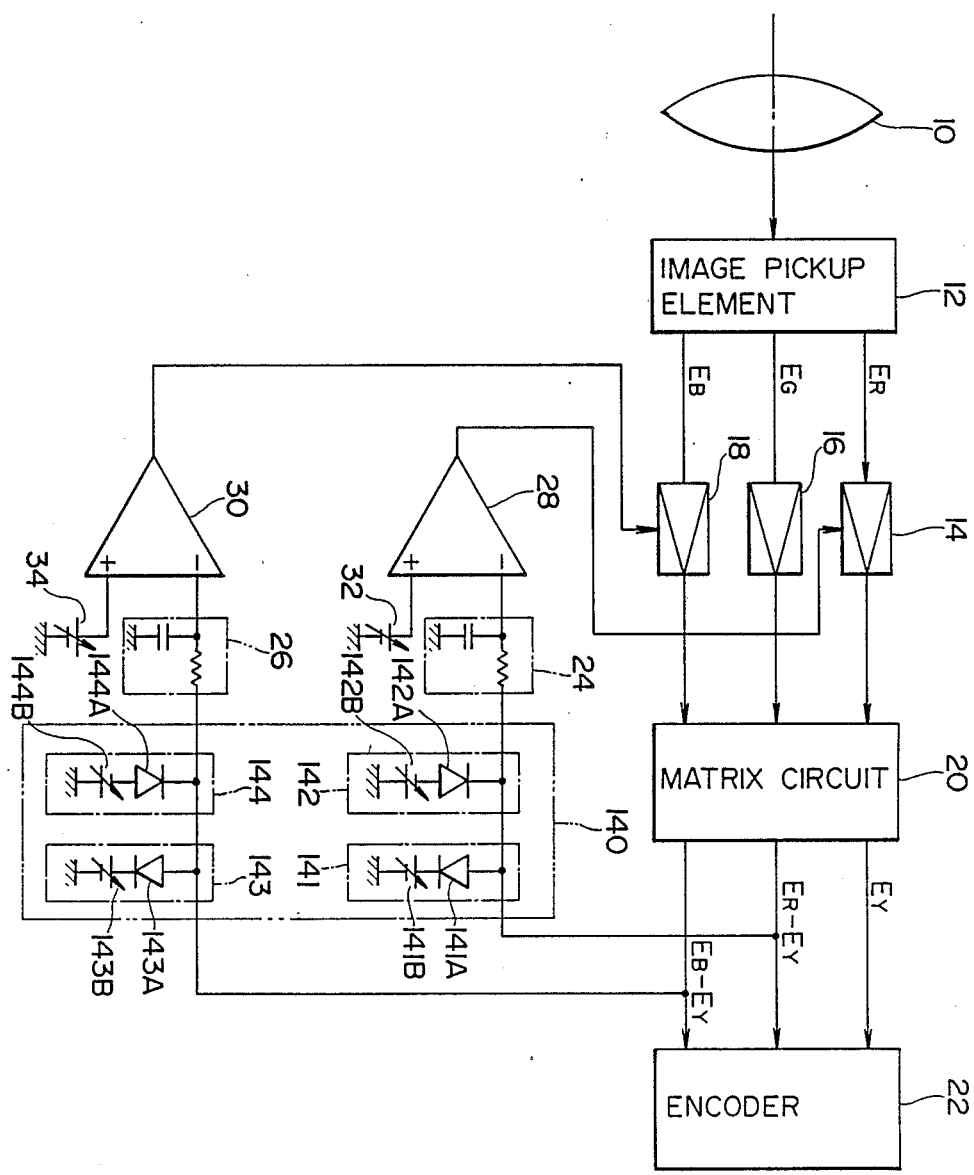
FIG. 8 is a block diagram of a fifth embodiment of an automatic white balance adjusting apparatus according to the invention.

Now, let us consider that a color difference signal $(E_R-E_Y)$ shown in FIG. 2(B) is obtained from a picture including a strong red color as shown in FIG. 2(A). If the color difference signal is integrated over the entire screen, then the average value of the integrations is moved in the red direction away from a black level. Then, if such automatic white balance adjustment as shown in FIG. 8 is made, then the color of the person's face is controlled in error in the direction of a complementary color (cyanogen, blue) of red.

Therefore, in order to blank the color difference signal representing the strong red color out of the pattern in FIG. 2(A), there is established a certain level (a slice level) and then a strong color difference signal exceeding the slice level is blanked to a black level (a DC value to be pedestal clamped, that is, a reference level), as shown in FIG. 2(C). This removes the strong color difference signal from the color difference signal of the original picture pattern, so that the average value of the color difference signal can be made to approach to a grey color.

However, this is not always limited the above-mentioned case in which the strong color difference signal exceeding the slice level is blanked to the black level, but the average value of the color difference signal may be modified to be identical with the slice level, or modified to an arbitrary level present between the slice and black levels as shown in FIG. 2(D).

Figure 1:
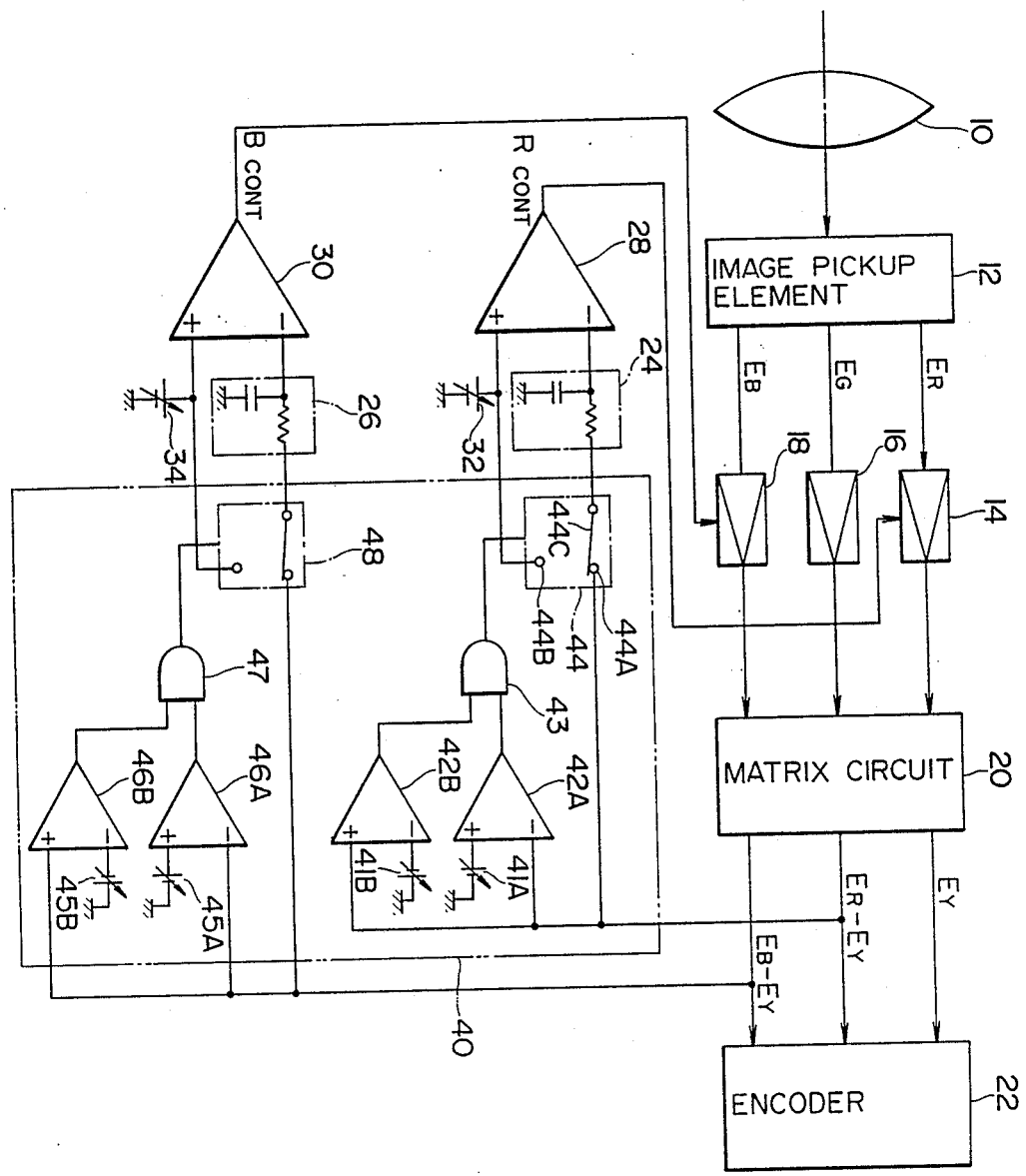
FIG. 1 is a block diagram of a first embodiment of an automatic white balance adjusting apparatus according to the invention.
Figure 15:
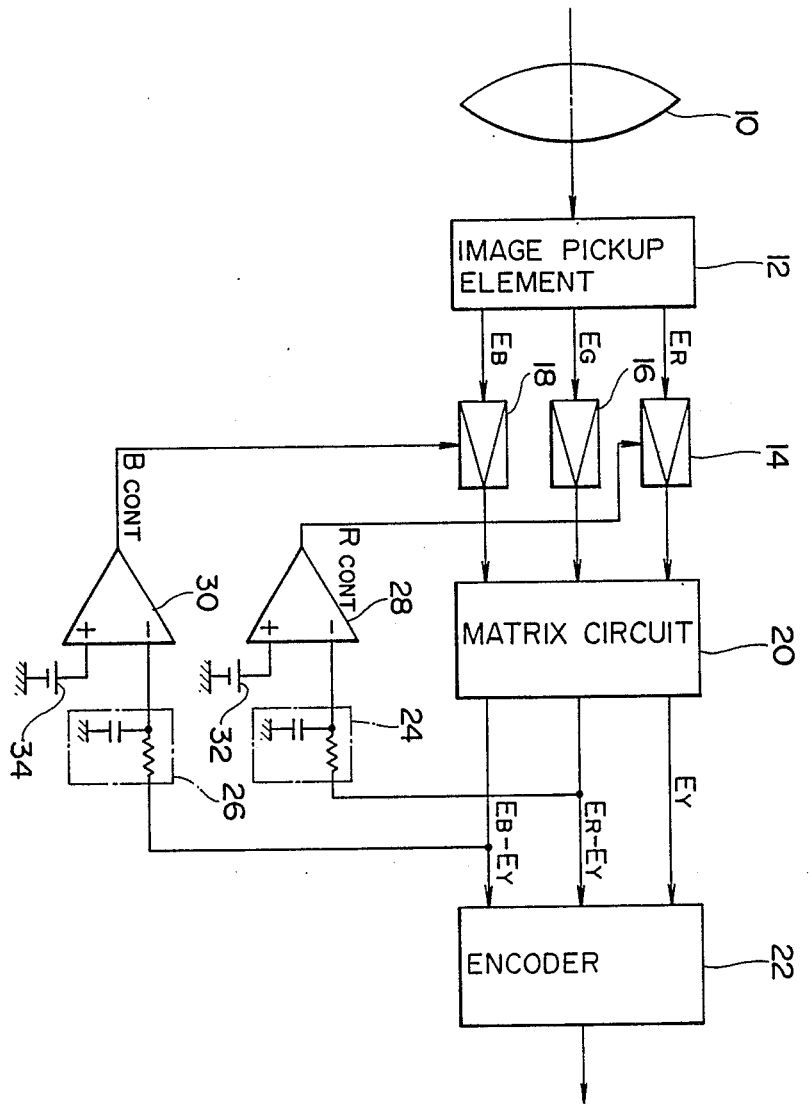

Referring now to FIG. 1, there is shown a block diagram of a first embodiment of an automatic white balance adjusting apparatus according to the present invention. In this figure, the common parts as in FIG. 15 are given the same designations and the detailed description thereof are omitted here.

As can be understood clearly from FIG. 1 as well, a part a blanking control part 40 shown by two-dot chained lines is the portion that is added by the present invention and the blanking control part 40 is used to blank the above-mentioned strong color difference signal.

This blanking control part 40 is composed of an upper slice level setting means 41A, a lower slice level setting means 41B, comparators 42A, 42B, an AND circuit 43 and a blanking switch 44 which are used for a color difference signal ($E_R-E_Y$), as well as an upper slice level setting means 45A, a lower slice level setting means 45B, comparators 46A, 46B, an AND circuit 47 and a blanking switch 48 which are used for a color difference signal ($E_B-E_Y$).

The upper and lower slice level setting means 41A and 41B are respectively used to set up upper and lower slice levels for blanking strong color difference signals on the red and cyanogen sides of the color difference signal ($E_R-E_Y$), and they also output the upper and lower slice levels, respectively.

The upper slice level and the color difference signal ($E_R-E_Y$) are respectively applied to the positive and negative inputs of the comparator 42A, and the comparator 42A compares these two input signals to output an H level signal when the color difference signal ($E_R-E_Y$) is smaller than the upper slice level and to output a strong color difference detection signal (an L level signal) when the color difference signal is greater than the upper slice level. Also, to the positive and negative inputs of the comparator 42B are applied the color difference signal ($E_R-E_Y$) and the lower slice level, respectively. The comparator 42B compares these two input signals and outputs the H level signal when the color difference signal ($E_R-E_Y$) is greater than the lower slice level while it outputs the strong color difference detection signal (L level signal) when the color difference signal is smaller than the lower slice level.

The AND circuit 43 outputs an H level signal when both of the two input signals from the comparators 42A, 42B are H level signals, that is, when the color difference signal ($E_R-E_Y$) is present between the upper and lower slice levels while it outputs an L level signal when at least one of the two input signals is an L level signal, that is, when the color difference signal ($E_R-E_Y$) goes beyond the upper or lower slice level.

The blanking switch 44 comprises an input contact 44A to which the color difference signal ($E_R-E_Y$) is input, an input contact 44B to which a reference level from a reference level setting means 32 is input, and a traveling contact 44C which can be selectively connected to one of these contacts 44A, 44B. When the H level signal is input from the AND circuit 43, the blanking switch 44 connects the traveling contact 44C to the contact 44A and outputs the color difference signal ($E_R-E_Y$) to an integrating circuit 24. When the L level signal is input from the AND circuit 43, the blanking switch 44 connects the traveling contact 44C to the contact 44B and outputs the reference level to the integrating circuit 24.

On the other hand, the upper and lower slice level setting means 45A and 45B are respectively used to set up the upper and lower slice levels which are respectively used to blank a strong color difference signal on the blue side of the color difference signal ($E_B-E_Y$) and a strong color difference signal on the yellow side thereof. Also, the comparators 46A, 46B, AND circuit 47 and blanking switch 48 can be operated similarly to the above-mentioned comparators 42A, 42B, AND circuit 43 and blanking switch 44 and, therefore, the detailed description thereof is omitted here.

As discussed above, the integrating circuits 24 and 26 integrate the color difference signals ($E_R-E_Y$) and ($E_B-E_Y$), respectively. In such integration, when the color difference signal provides a strong color difference signal going beyond the upper or lower slice level, the strong color difference signal is blanked before the color difference signal is integrated (that is, the reference level is integrated in place of the strong color difference signal).

Due to this, even when an original picture includes in part a strong color, the remaining colors of the color difference signal, with the strong color being removed from the picture, can be averaged and the resultant average value can be made to approach a grey color, so that a proper white balance adjustment, which is free from a strong color, can be achieved.

Next, description will be given below of a case in which the slice level can automatically set to a proper value.

In FIGS. 4(A) and (B), there are shown the same picture pattern and color difference signal ($E_R-E_Y$) as in FIGS. 2 (A) and (B). When a color temperature varies with respect to the picture pattern, then the color difference signal ($E_R-E_Y$), while maintaining its original waveform, is caused to vary such that DC offset is moved vertically with respect to the black level, as shown in FIG. 4(C). Here, if the same slice level as in FIG. 4(B) is set, then a portion shown by oblique lines needing no blanking, A in FIG. 4(C), is detected in error as a strong color difference signal and is then blanked.

In view of this, if the slice level is also moved upward by an increase ($\Delta v$) of the average value of the color temperature change as shown in FIG. 4(D), then at the relatively same position as in FIG. 4(B) only a strong red color is detected and blanked.

Figure 3:
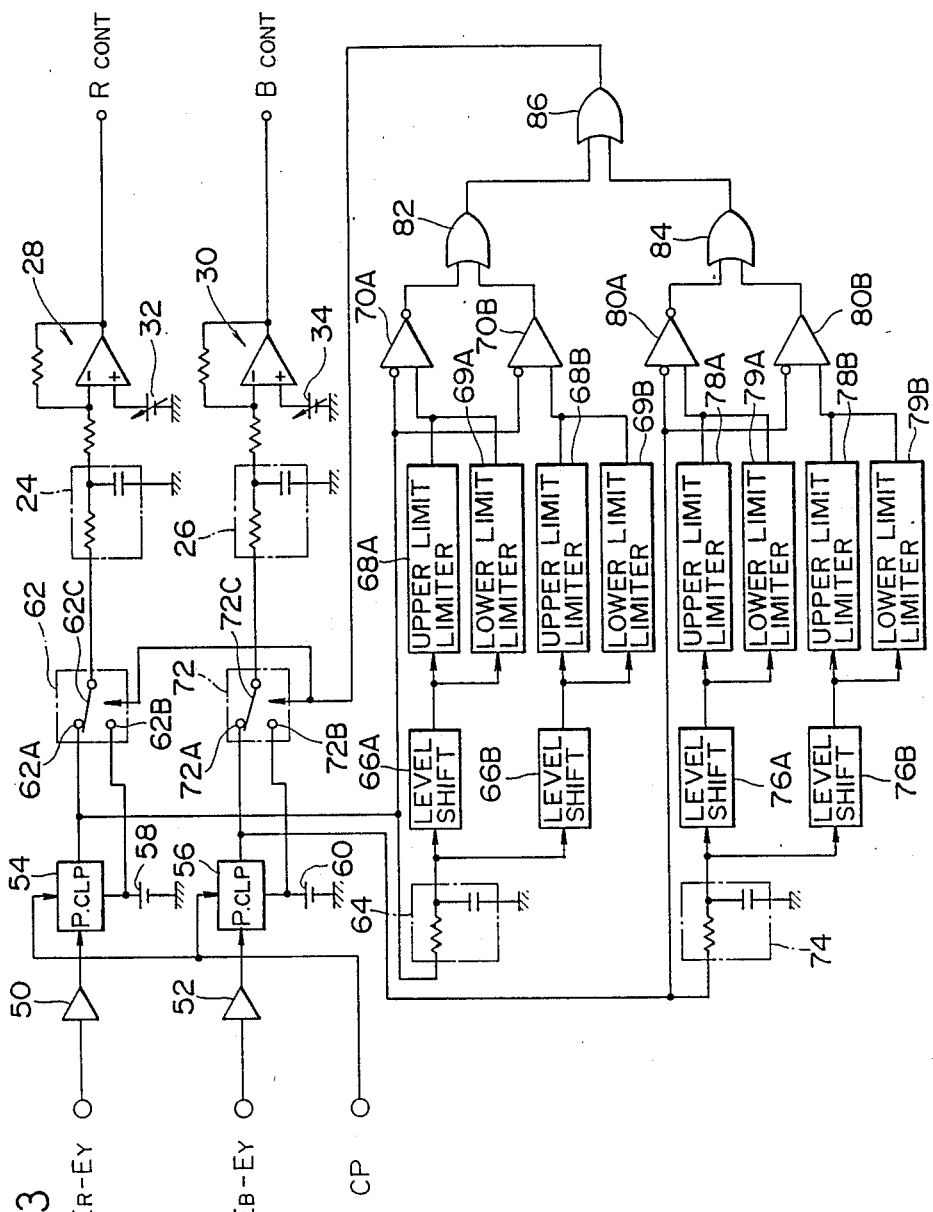
FIG. 3 is a block diagram of the main portions of a second embodiment of an automatic white balance adjusting apparatus according to the invention.

Referring now to FIG. 3, there is shown a block diagram of the main portions of a second embodiment of an automatic white balance adjusting apparatus according to the invention, in which a slice level can be automatically set to a proper value.

In FIG. 3, the color difference signals ($E_R-E_Y$) and ($E_B-E_Y$) are respectively input through amplifiers 50, 52 to clamp circuits 54, 56. A clamp pulse CP is also applied to the clamp circuits 54 and 56, and further the DC value (a reference level) to be pedestal clamped is applied to the clamp circuits 54 and 56 respectively from setting means 58 and 60. The clamp circuits 54 and 56 respectively pedestal clamp the color difference signals ($E_R-E_Y$) and ($E_B-E_Y$) in synchronization with the clamp pulse CP and then output them to a switch 62, and integrating circuit 64, and comparators 70A, 70B, as well as to a switch 72, an integrating circuit 74, and comparators 80A, 80B.

The integrating circuit 64 integrates the color difference signal ($E_R-E_Y$) that is input thereto, and outputs the average value of the integrations over the entire screen to level shift circuits 66A and 66B. The level shift circuit 66A shifts up the average value input thereto to a level which is greater by a given level, and outputs it as an upper slice level through upper and lower limit limiters 68A and 69A to the comparator 70A. Similarly, the level shift circuit 66B shifts down the average value input thereto to a level which is smaller by a given level, and outputs it as a lower slice level through upper and lower limit limiters 68B and 69B to the comparator 70B.

Figure 5:
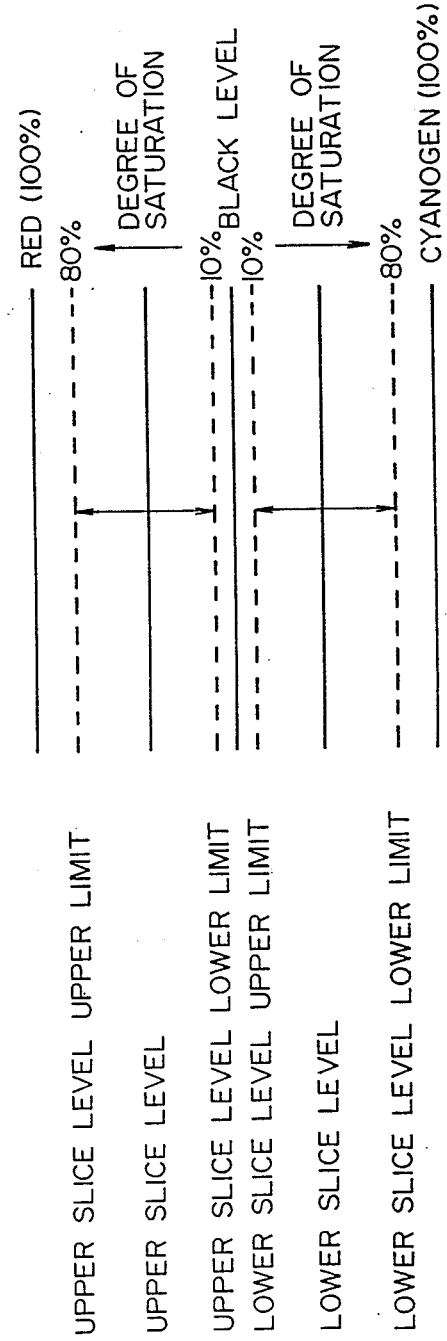

Here, the amount of shift in the level shift circuits 66A and 66B, as shown in FIG. 5, is set to the range of a third to a half of the level of 100% saturation (the density of color). Also, the upper and lower limit limiters 68A and 69A respectively limit the levels input thereto to a range of 80% to 10% of the saturation level (+) of the color difference signal ($E_R-E_Y$), while the upper and lower limit limiters 68B and 69B respectively limit the levels input thereto to a range of 10% to 80% of the saturation level (−) of the color difference signal. In other words, while the upper and lower slice levels are caused to vary according to the average value on the entire screen of the color difference signal ($E_R-E_Y$), the range of variations of the upper slice level is limited by the upper and lower limit limiters 68A and 69A and the varying range of the lower slice level is limited by the upper and lower limit limiters 68B and 69B.

The reason why the slice level is limited by the limiters in the above-mentioned manner is that, when the average value on the entire screen of the color difference signal goes extremely high due to the picture pattern and color temperature, if the above-mentioned limits are not set, both the upper and lower slice levels are varied according to the average value so that the upper slice level may exceed the saturation level or the lower slice level may go down beyond the black level. Another reason is that, when the slice level exceeds or is very near the saturation level, the blanking of the strong color difference signal is quite impossible or most of the strong difference signals cannot be blanked, with the result that color failure may be produced. Here, it should be noted that the limit levels of the respective limiters are not limited to those in the illustrated embodiment, but they can be set to any desired levels according to cases.

The comparators 70A and 70B are equivalents to the comparators 42A and 42B in FIG. 1, but the comparators 70A and 70B respectively output an L level signal when the color difference signal ($E_R-E_Y$) is present between the upper and lower slice levels and output an H level signal when the color difference signal goes up beyond the upper slice level or goes down beyond the lower slice level.

Also, the integrating circuit 74, level shift circuits 76A, 76B, upper limit limiters 78A, 78B, and lower limit limiters 79A, 79B create upper and lower slice levels for the color difference signal ($E_B-E_Y$), similarly as mentioned above. Comparators 80A and 80B respectively output an L level signal when the color difference signal ($E_B-E_Y$) is present between the upper and lower slice levels and output an H level signal when the color difference signal exceeds the upper of lower level. The switches 62 and 72 normally connect the traveling contacts 62C and 72C respectively to the contact 62A and 72A to guide the pedestal clamped color difference signals ($E_R-E_Y$) and ($E_B-E_Y$) respectively to the integrating circuits 24 and 26. When the H level signal is input thereto from the comparator 70A or 70B through OR circuits 82, 86, or when the H level signal is input thereto from the comparator 80A or 80B through OR circuits 84, 86, the switches 62 and 72 respectively change the traveling contacts 62C, 72C over to the contacts 62B and 72B to which the reference level is input, thereby guiding the reference level to the integrating circuits 24 and 26. A circuit, which creates the gain control signals $R_{CONT}$ and $B_{CONT}$ based on the integration values by the integrating circuits 24 and 26, is similar to that shown in FIG. 15 and thus the description thereof is omitted here. Also, in this embodiment, when one of the color difference signals ($E_R-E_Y$) and ($E_B-E_Y$) goes beyond the slice level, both of the then color difference signals ($E_R-E_Y$) and ($E_B-E_Y$) are blanked, but this is not limitative, for example, the color difference signals may be blanked individually, likewise as in the apparatus shown in FIG. 1.

Figure 6:
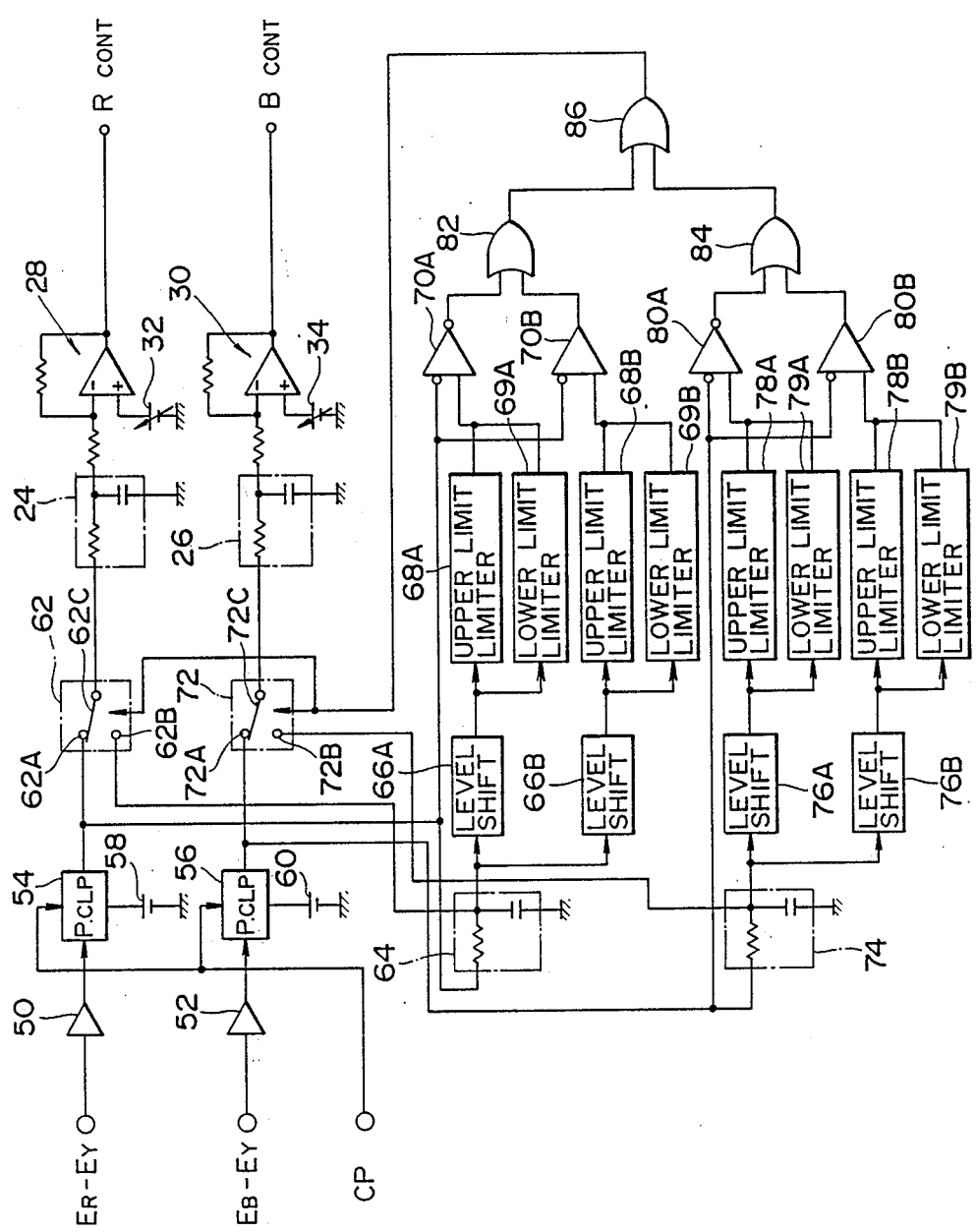
FIGS. 6 and 7 are respectively block diagrams of the main portions of third and fourth embodiments of an automatic white balance adjusting apparatus according to the invention.
Figure 7:
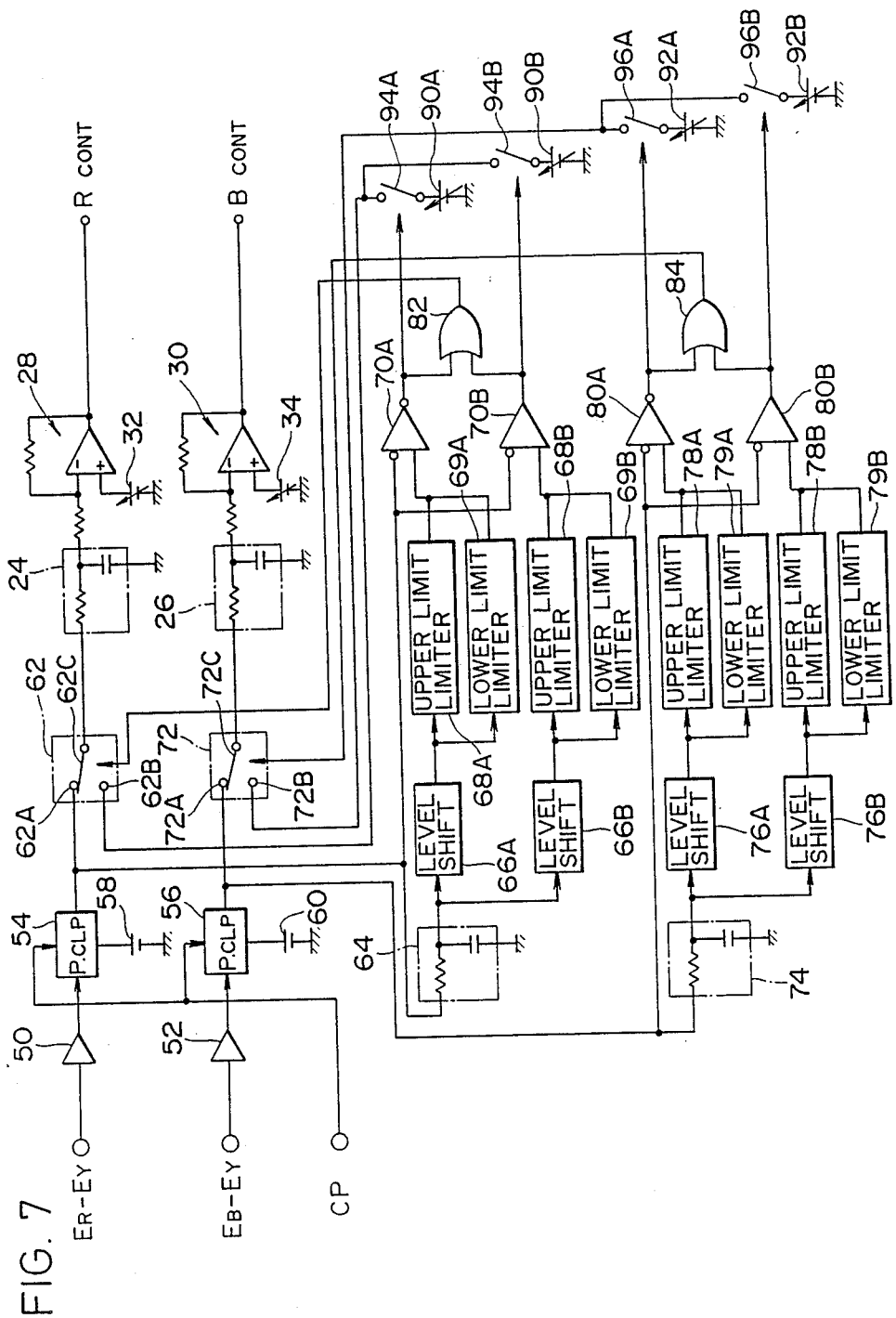

Now, in FIGS. 6 and 7, there are shown circuit diagrams respectively illustrating the main portions of third and fourth embodiments of an automatic white balance adjusting apparatus according to the invention. While the apparatus shown in FIGS. 1 and 3 blank a strong color difference signal exceeding a slice level to a predetermined reference level indicating a colorless state, the apparatus shown in FIGS. 6 and 7 are capable of automatically changing the abovementioned reference level or setting the reference level to an arbitrary level.

In other words, in FIG. 6 the output levels (the average values on the entire screen of the color difference signal) of the integrating circuits 64 and 74 are respectively applied to the contacts 62B and 72B of the switches 62 and 72. For this reason, when a strong color difference signal exceeding the slice level is input, the average value of the color difference signal on the screen is output to the following integrating circuit 24 or 26, in place of the strong color difference signal. Other circuits shown in FIG. 6 are similar to those in FIG. 3 and, therefore, the description thereof is omitted here.

On the other hand, in FIG. 7, there are provided level setting means 90A, 90B, 92A, 92B respectively used to set the levels to be output to the integrating circuits 24, 26 in place of the strong color difference signal, switches 94A and 94B which respectively output the set levels of the level setting means 90A and 90B to the contact 62B of the switch 62, and switches 96A and 96B respectively for outputting the set levels of the level setting means 92A, 92B to the contact 72B of the switch 72.

The level setting means 90A and 90B set up levels to be output to the integrating circuit 24 in place of such color difference signals ($E_R-E_Y$) as exceed its upper or lower slice level, and in particular they set up an arbitrary level which represents a color difference signal weaker than the slice level. Similarly, when the color difference signals ($E_B-E_Y$) go beyond its upper or lower slice level, the level setting means 92A and 92B set up levels to be output to the integrating circuit 26 in place of such color difference signals and in particular in these setting means there is set up an arbitrary level which is weaker than the slice level.

Also, when the comparators 70A, 70B, 80A, 80B respectively detect strong color difference signals and output H level signals, the switches 94A, 94B, 96A, 96B are respectively caused to turn on by the thus output H level signals.

Therefore, for example, if the comparator 70A detects a strong color difference signal and outputs an H level signal, then the level preset by the level setting means 90A is guided to the contact 62B of the switch 62 and at the same time the above-mentioned H level signal is input through OR circuit 82 to the switch 62 to thereby connect the traveling contact 62C of the switch 62 to the contact 62B. As a result of this, the level preset by the level setting means 90A is guided to the integrating circuit 24 in place of the strong color difference signal. Other circuits in FIG. 7 are similar to those in FIG. 3 and, therefore, the description thereof is omitted here.

Referring now to FIG. 8, there is shown a block diagram of a fifth embodiment of an automatic white balance adjusting device according to the invention. In this figure, parts used in common with those in FIG. 15 are given the same designations and the detailed description thereof is omitted here.

As can be understood clearly from FIG. 8 as well, a part shown by two-dot chained lines, an amplitude limiting part 140, is the portion that is added in the fifth embodiment, and the amplitude of the above-mentioned strong color difference signal can be limited by the amplitude limiting part 140.

The amplitude limiting part 140 comprises an upper limit limiter 141 which is composed of an upper bias power source 141A of the color difference signal $(E_R-E_Y)$ and a diode 141B, a lower limit limiter 142 composed of a lower bias power source 142A and a diode 142B, an upper limit limiter 143 composed of an upper bias power source 143A of the color difference signal $(E_B-E_Y)$ and a diode 143B, and a lower limit limiter 144 composed of a lower bias power source 144A and a diode 144B.

The upper and lower bias power sources 141A and 142A respectively set up upper and lower slice levels which are used to slice the strong color difference signal on the red side of the color difference signal $(E_R-E_Y)$ and the strong color difference signal on the cyanogen side of the color difference signal, respectively. Also, the upper and lower bias power sources 143A and 144A respectively set up upper and lower slice levels which are used to slice the strong color difference signal on the blue side of the color difference signal $(E_B-E_Y)$ and the strong color difference signal on the yellow side of the color difference signal, respectively.

Figure 9:
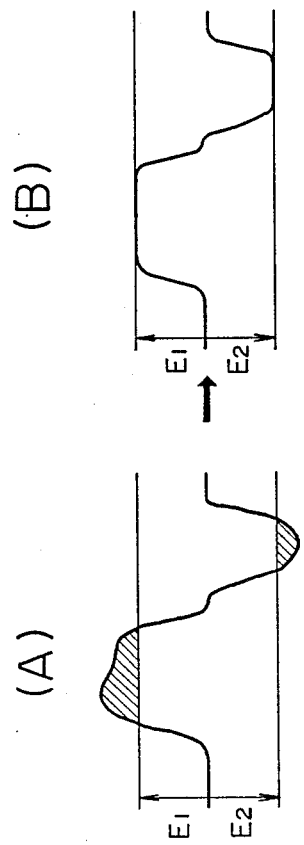
FIGS. 9 (A) and (B) are respectively wave form charts used to explain FIG. 8.

For this reason, the amplitude of the strong color difference signal going beyond the above-mentioned upper slice level or lower slice level is limited to the upper or lower slice level by the upper limit limiter or lower limit limiter. For example, if such a color difference signal $(E_R-E_Y)$ as shown in FIG. 9(A) is input, where the bias voltage from the bias power source 141A of the upper limit limiter 141 is expressed as E1 and the bias voltage from the bias power source 142A of the lower limit limiter 142 as E2, then the color difference signals limited to such a color difference signal as shown in FIG. 9(B) by the upper and lower limit limiters 141 and 142 and is then output to the integrating circuit 24.

As a result, even when an original picture includes in part a strong color, the average value of the colors of the picture with the strong color removed from the picture can be obtained and the average value can be made to approach a grey color, so that the white balance can be adjusted properly without being influenced by the strong color.

Figure 10:
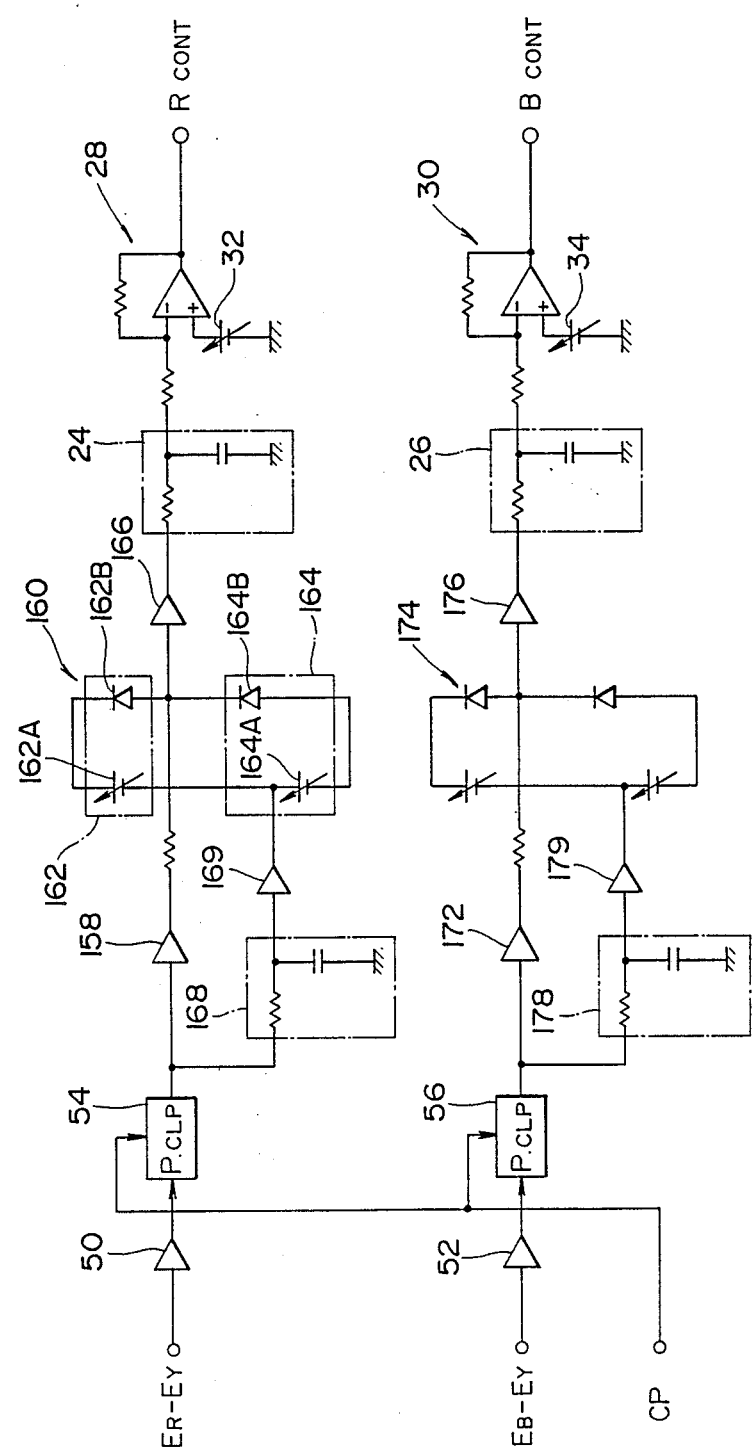
FIG. 10 is a block diagram of the main portions of a sixth embodiment of an automatic white balance adjusting apparatus according to the invention.

Referring now to FIG. 10, there is shown a block diagram of the main portions of a sixth embodiment of an automatic white balance adjusting apparatus according to the invention, which is different from the above-described fifth embodiment in that it is capable of automatically setting a slice level to a proper value.

In FIG. 10, the color difference signals $(E_R-E_Y)$ and $(E_B-E_Y)$ are respectively input through the amplifiers 50, 52 to the clamp circuits 54, 56. A clamp pulse CP is applied to the clamp pulses 54 and 56, respectively, and the clamp circuits 54 and 56 respectively pedestal clamp the color difference signals $(E_R-E_Y)$ and $(E_B-E_Y)$ in synchronization with the clamp pulse CP.

The color difference signal $(E_R-E_Y)$ that is pedestal clamped by the clamp circuit 54 is input through a buffer 158, an amplitude limiting part 160 and a buffer 166 to the integrating circuit 24 as well as to an integrating circuit 168. The integrating circuit 168 integrates the color difference signal $(E_R-E_Y)$ input thereto and outputs the average value of the integrations on the entire screen through a buffer 169 to the amplitude limiting part 160.

The amplitude limiting part 160 comprises an upper limit limiter 162 which is composed of an upper bias power source 162A and a diode 162B, and a lower limit limiter 164 composed of a lower bias source 164A and a diode 164B. The upper bias power source 162A applies to the reverse direction of the diode 162 a bias voltage (and upper slice level) which is greater by a given level than the integration average value input from the integrating circuit 168. The lower bias power source 164A applies to the forward direction of the diode 164B a bias voltage (a lower slice level) which is smaller by a given level than the integration average value input from the integrating circuit 168. For this reason, the upper and lower slice levels respectively vary according to the integration average value applied from the integrating circuit 168.

And, among the color difference signals $(E_R-E_Y)$ input to the above-mentioned amplitude limiting part 160, the signals that go beyond the above-mentioned upper slice level or lower slice level are to be output to the following integrating circuit 24 after the amplitude values thereof are limited to the upper or lower slice level.

Similarly, the color difference signal $(E_B-E_Y)$ that is pedestal clamped by the clamp circuit 56 is input through a buffer 172, an amplitude limiting part 174 and a buffer 176 to the integrating circuit 26 as well as to an integrating circuit 178. The integrating circuit 178 integrates the color difference signal $(E_B-E_Y)$ input thereto and then applies the integration average value on the entire screen through a buffer 179 to the amplitude limiting part 174. Since the amplitude limiting part 174 is similar in structure to the above-described amplitude limiting part 160 and the circuits employed in this embodiment to create the gain control signals $R_{CONT}$ and $B_{CONT}$ in accordance with the integration values of the integrating circuits 24 and 26 is similar to the circuits shown in FIG. 15, the description thereof is omitted here.

Figure 11:
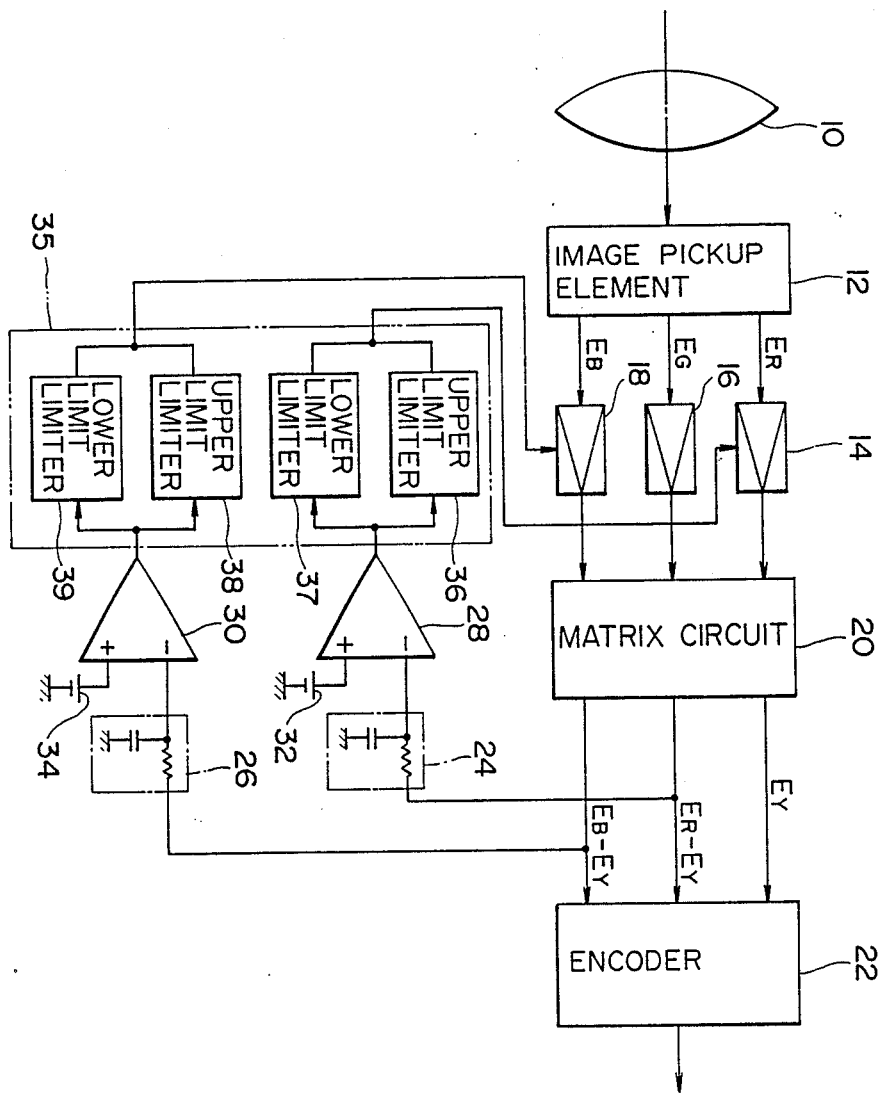
FIGS. 11 and 12 are respectively block diagrams of seventh and eighth embodiments of an automatic white balance adjusting apparatus according to the invention.

Now, in FIG. 11, there is shown a block diagram of a seventh embodiment of an automatic white balance adjusting apparatus according to the invention. In this figure, the parts that are used in common with those in FIG. 15 are given the same designations and the detailed description thereof is omitted here.

As can be understood from FIG. 11 as well, the amplitude limiting part 35 shown by two-dot chained lines is a part which is added in the seventh embodiment. The gain control signals $R_{CONT}$ and $B_{CONT}$ that are output from the comparison amplifiers 28 and 30 are to be applied to the amplifiers 14 and 18 after the amplitudes thereof are limited by the amplitude limiting part 35.

The amplitude limiting part 35 comprise upper and lower limit limiters 36 and 37 which respectively limit the upper and lower limits of the gain control signal $R_{CONT}$ output from the comparison amplifier 28, and upper and lower limit limiters 38 and 39 which respectively limit the upper and lower limits of the gain control signal $B_{CONT}$ output from the comparison amplifier 30.

The respective limit values of the upper and lower limit limiters 36 and 37 for the gain control signal $R_{CONT}$ and the upper and lower limit limiters 38 and 39 for the gain control signal $B_{CONT}$ are determined such that the gain controls of amplifiers 14, 18 of the red and blue signals by the gain control signals $R_{CONT}$, $B_{CONT}$ can be controlled when a color temperature goes beyond a predetermined range.

For example, when the above-mentioned predetermined range of the color temperature is assumed to be 2800° K.~7200° K., the respective limit values of the limiters 36~39 are set as follows:

At first, the limit values of the upper and lower limit limiters 36 and 39 are determined to be identical with the respective levels of the gain control signals $R_{CONT}$ and $B_{CONT}$ that are output from the comparison amplifiers 28 and 30 when a white object is illuminated by a light source having a color temperature of 7200° K. In other words, when illuminated by the light source having a color temperature of 7200° K., then the white object, that is, in order to return it to a predetermined standard white color (for example, a white color obtained when a white object is illuminated by a light source having a color temperature of 4000° K.~5000° K.), the gain control signals $R_{CONT}$ and $B_{CONT}$ respectively having a predetermined level are output so as to increase the gain of a red signal as well as to reduce the gain of a blue signal. And, the respective levels of the then used gain control signals $R_{CONT}$ and $B_{CONT}$ are considered as the limit values of the upper and lower limit limiters 36 and 39.

Similarly, the limit values of the lower and upper limit limiters 37 and 38 are determined to be identical with the respective levels of the gain control signals $R_{CONT}$ and $B_{CONT}$ output from the comparison amplifiers 28 and 30 when a white object is illuminated by a light source having a color temperature of 2800° K. In other words when illuminated by the light source having a color temperature of 2800° K., the white object then becomes reddish. In order to adjust the white balance of the object and return it to a predetermined standard white color, the gain control signals $R_{CONT}$ and $B_{CONT}$ respectively having a predetermined level are output so as to lower the gain of a red signal as well as to increase the gain of a blue signal. And, the respective levels of the then used gain control signals $R_{CONT}$ and $B_{CONT}$ are employed as the limit values of the lower and upper limit limiters 37 and 38, respectively.

Therefore, when the color temperature varies within a predetermined range (in the above-mentioned example, 2800° K.~7200° K.), the gain control signals $R_{CONT}$ and $B_{CONT}$ are not limited by the respective limiters 36~39, with the result that a white object is adjusted to be white (that is, a standard white color), regardless of the color temperature. On the other hand, when the color temperature exceeds a predetermined range, the gain control signals $R_{CONT}$ and $B_{CONT}$ are limited by the limiters 36, 39 or limiters 37, 38, with the result that a white object becomes slightly reddish when the color temperature is lower and slightly bluish for the higher color temperature.

In the above-mentioned embodiment, the upper and lower limits of the gain control signals $R_{CONT}$ and $B_{CONT}$ are limited by the limiters 36~39 to prevent more gain controls than necessary on the red and blue signals. However, this is not limitative, but similar effects can also be obtained by previously limiting the variable gain ranges of the amplifiers 14 and 18 that respectively amplify the red and blue signals.

Figure 12:
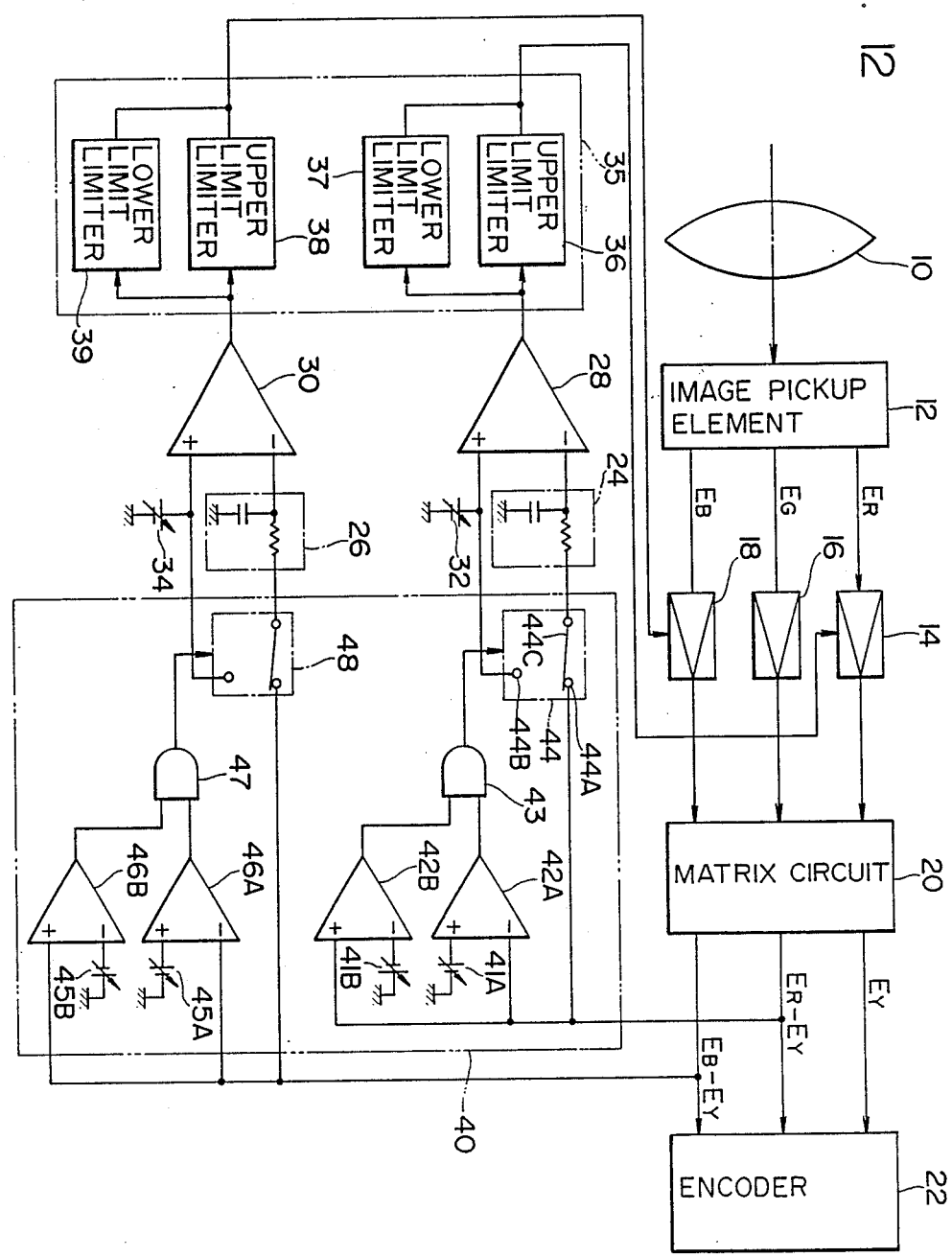
Figure 13:
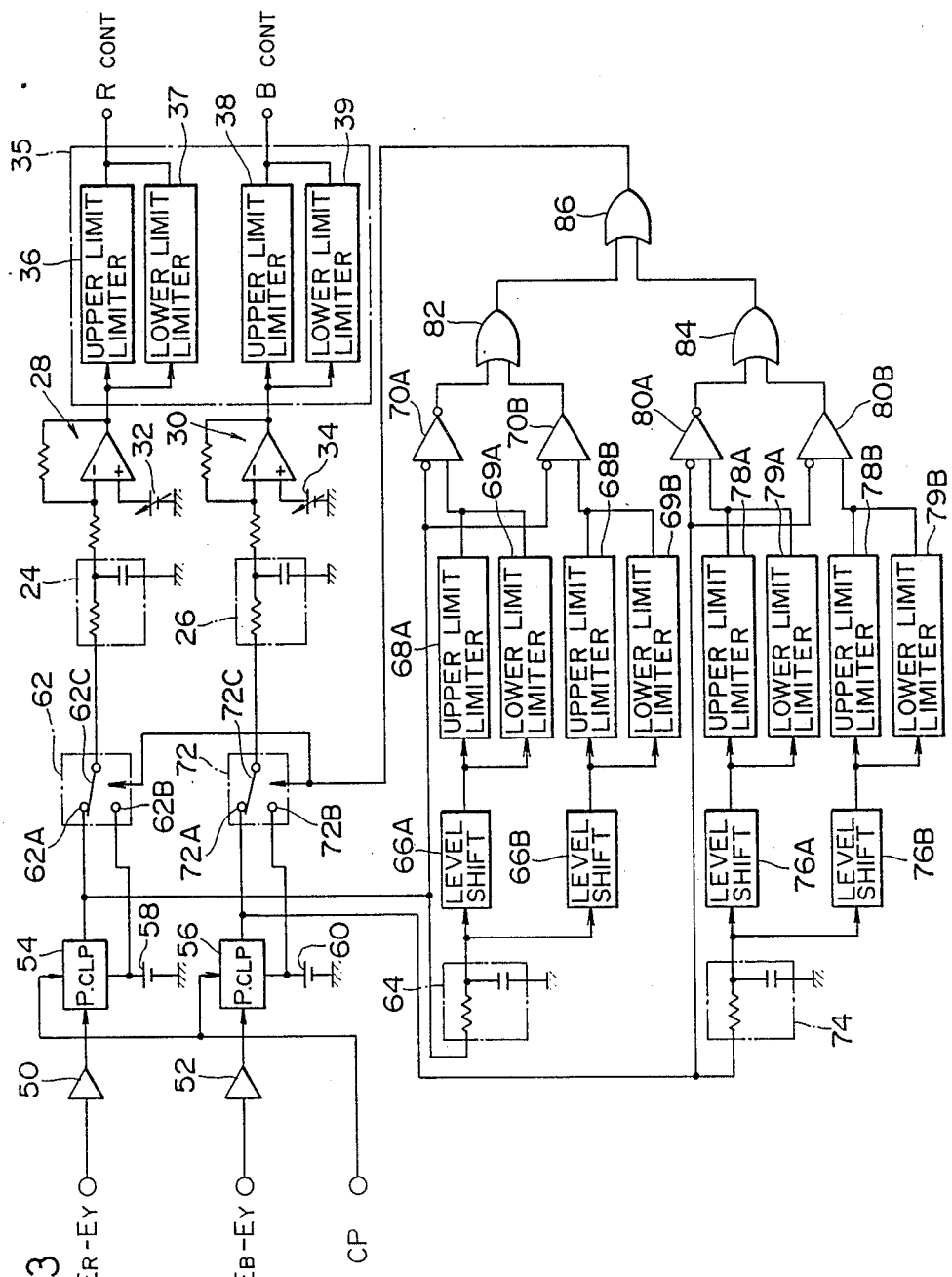
FIG. 13 is a block diagram of the main portions of a ninth embodiment of an automatic white balance adjusting apparatus according to the invention.
Figure 14:
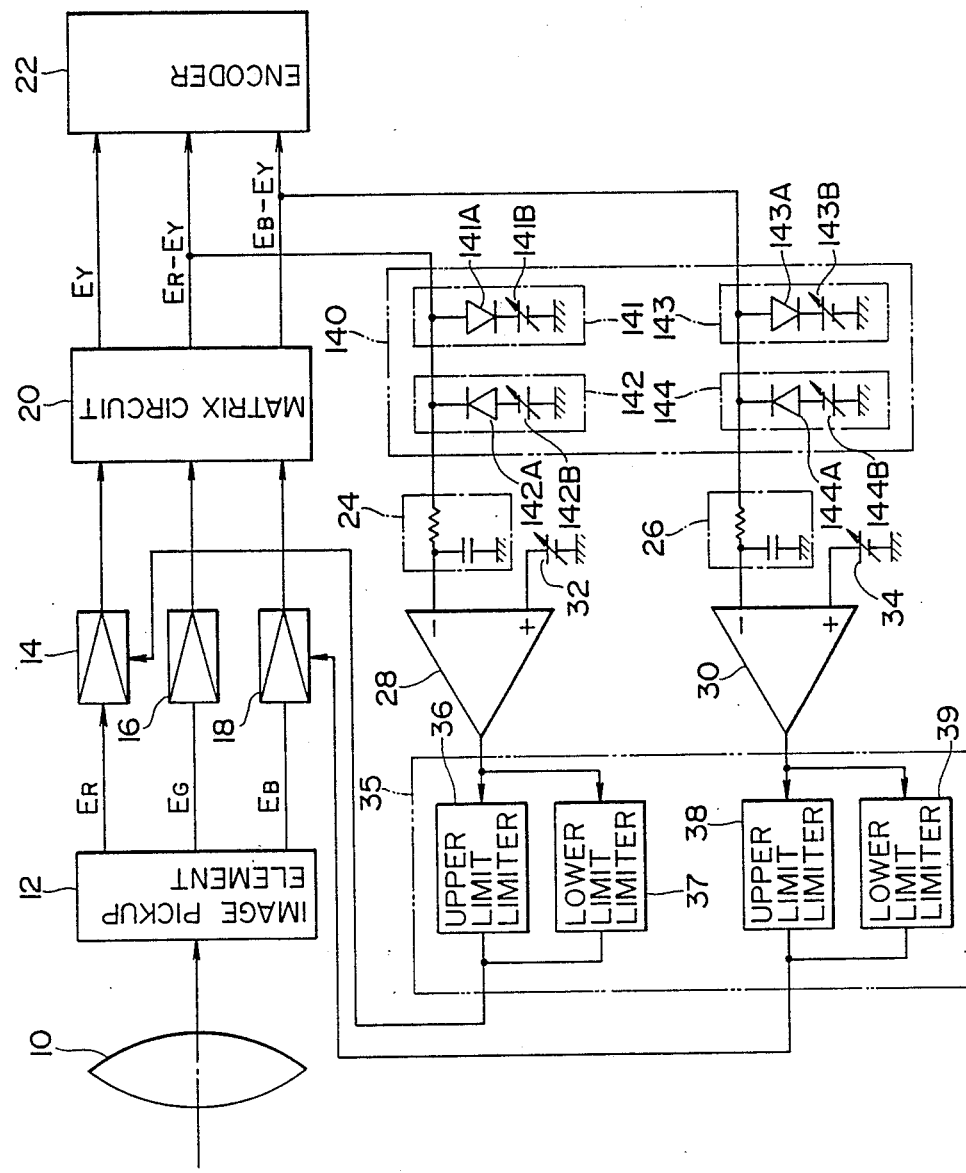
FIG. 14 is a block diagram of a tenth embodiment of an automatic white balance adjusting apparatus according to the invention; and, FIG. 15 is a block diagram of an example of an automatic white balance adjusting apparatus according to the prior art.

Referring now to FIGS. 12 to 14, there are shown block diagrams which respectively illustrate an eighth embodiment to a tenth embodiment of an automatic white balance adjusting apparatus according to the invention, which are respectively capable of eliminating or minimizing the above-mentioned erroneous control or color failure. Each of these three embodiments is a combination of one of the first, second and fifth embodiments with the seventh embodiment which is capable of performing white balance adjustment having a property very close to the sensitivity of a human being with respect to the variations of color temperature.

In other words, the eight embodiment shown in FIG. 12 is a combination of the block diagram of the first embodiment (in FIG. 1) with the amplitude limiting part 35 of the seventh embodiment (in FIG. 11); similarly, the ninth embodiment shown in FIG. 13 is a combination of the block diagram of the second embodiment (in FIG. 3) with the amplitude limiting part 35 of the seventh embodiment; and, the tenth embodiment shown in FIG. 14 is a combination of the block diagram of the fifth embodiment (in FIG. 8) with the amplitude limiting part 35 of the seventh embodiment.

Also, each of the eighth to tenth embodiments of the present automatic white balance adjusting apparatus is provided with functions which are inherent in both of one of the first, second and fifth embodiments and the seventh embodiment. The detailed description of the respective parts of the FIGS. 12 to 14 is omitted here because it is common with the above-mentioned description as to FIGS. 1, 3, 8, and 11.

As has been described hereinbefore, in accordance with method and apparatus for automatically adjusting white balance according to the invention, when a picture includes a strong color (a color having a great degree of saturation), the color is blanked or after the magnitude of the color is limited to a predetermined level the color is averaged, so that the average value of the color on the entire screen can be made to approach a grey color, thereby eliminating or minimizing an erroneous control or color failure and thus realizing an excellent white balance adjustment.

Also, according to the invention, since there are provided predetermined limits respectively to the gains of red and blue signals, when a color temperature goes beyond a predetermined range, the gain control on the red or blue signal is restricted so that white balance adjustment having a property close to the sensitivity of a human being is possible.

It should be understood, however, that there is no intention to limit the invention to the specific forms disclosed but on the contrary, the invention includes all modifications, alternate constructions and equivalents falling within the spirit and scope of the invention as expressed in the appended claims.

What is claimed is:

1. A method of automatically adjusting white balance in which color difference signals ($E_R-E_Y$) and ($E_B-E_Y$) are created respectively from signals obtained by photographing an object, the color difference signals are respectively integrated over the entire screen, and the gains of red and blue signals are controlled so that the integration average values can be identical with predetermined reference levels respectively; said method being characterized in that, with respect to said respective color difference signals, there is set a slice level for detecting a strong color difference, and that, if, among said respective color difference signals, there is present a strong color difference signal which exceeds said slice level, in place of said strong color difference signal a predetermined level representing a weaker color difference signal than said slice level or the same level of said slice level is integrated to thereby remove said strong color difference signal from said respective color difference signals are to be individual.

2. A method as set forth in claim 1, wherein said slice level is set to levels which are respectively upper and lower by a given level than the integration average value obtained by integrating said color difference signal over the entire screen.

3. A method as set forth in claim 1, wherein said slice level is set to levels which are respectively upper and lower by a given level than the integration average value obtained by integrating said color difference signal over the entire screen, and also wherein there are set upper and lower limits to said upper and lower slice levels, respectively.

4. A method of automatically adjusting white balance in which color difference signals ($E_R-E_Y$) and ($E_B-E_Y$) are created respectively from signals obtained by photographing an object, the color difference signals are respectively integrated over the entire screen, and the gains of red and blue signals are controlled so that the integration average values can be identical with predetermined reference levels respectively; said method being characterized in that there are set predetermined limits respectively to the gains of said red and blue signals.

5. Apparatus for automatically adjusting white balance, comprising:

first and second gain control circuits respectively for controlling the gains of red and blue signals among signals obtained by photographing an object;

first and second integrating circuits respectively for integrating color difference signals ($E_R-E_Y$) and ($E_B-E_Y$) created from signals obtained by photographing said object over the entire screen;

first and second slice level setting means for setting up first and second slice levels respectively for detecting strong color difference signals from said color difference signals ($E_R-E_Y$) and ($E_B-E_Y$);

a first comparator for inputting therein said color difference signal ($E_R-E_Y$) and first slice level and outputting a strong color difference detection signal when said color difference signal exceeds said first slice level;

a second comparator for inputting therein said color difference signal ($E_B-E_Y$) and second slice level and outputting a strong color difference detection signal when said color difference signal exceeds said second slice level;

first and second level setting means respectively for setting up predetermined levels representing weaker color difference signals than said first and second slice levels respectively;

a first switch for outputting said predetermined level of said first level setting means to said first integrating circuit in place of said color difference signal ($E_R-E_Y$) while said first comparator is outputting said strong color difference detection signal or while one of said first and second comparators is outputting said strong color difference detection signal;

a second switch for outputting said predetermined level of said second level setting means to said second integrating circuit in place of said color difference signal ($E_B-E_Y$) while said second comparator is outputting said strong color difference detection signal or while one of said first and second comparators is outputting said strong color difference detection signal;

first and second reference level setting means for setting up predetermined reference levels with which the average values of said respective color difference signals on the entire screen are to be identical;

means for comparing the integration average value of said first integrating circuit with the reference level of said first reference level setting means and controlling the gain of said first gain control circuit so that said integration average value and said reference level can be identical with each other; and, means for comparing the integration average value of said second integrating circuit with the reference level of said second reference level setting means and controlling the gain of said second gain control circuit so that said integration average value and said reference level can be identical with each other.

6. Apparatus as set forth in claim 5, wherein said first level setting means and first reference level setting means are composed of the same setting means and said second level setting means and second reference level setting means are composed of the same setting means.

7. Apparatus for automatically adjusting white balance, comprising:

first and second gain control circuits respectively for controlling the gains of red and blue signals among signals obtained by photographing an object;

first and second amplitude limiting circuits for inputting therein color difference signals ($E_R-E_Y$) and ($E_B-E_Y$) created from signals obtained by photographing said object and removing a strong color difference signal from said color difference signals;

first and second integrating circuits respectively for integrating the color difference signals ($E_R-E_Y$) and ($E_B-E_Y$) that have respectively passed through said first and second amplitude limiting circuits over the entire screen;

first and second reference level setting means respectively for setting up predetermined reference levels with which the average values on the entire screen of said respective color difference signals are to be identical;

means for comparing the integration average value of said first integrating circuit with the reference level of said first reference level setting means and controlling the gain of said first gain control circuit so that said integration average value and said reference level can be identical with each other; and, means for comparing the integration average value of said second integrating circuit with the reference level of said second reference level setting means and controlling the gain of said second gain control circuit so that said integration average value and said reference level can be identical with each other.

8. Apparatus for automatically adjusting white balance, comprising:

first and second gain control circuits respectively for controlling the gains of red and blue signals among signals obtained by photographing an object;

first and second integrating circuits respectively for integrating color difference signals ($E_R-E_Y$) and ($E_B-E_Y$) created from signals obtained by photographing said object over the entire screen;

first and second reference level setting means respectively for setting up predetermined reference levels with which the average values on the entire screen of said respective color difference signals;

a first comparing means for comparing the integration average value of said first integrating circuit with the reference level of said first reference level setting means and outputting a first gain control signal to said first gain control circuit so that said integration average value and said reference value can be identical with each other;

a second comparing means for comparing the integration average value of said second integrating circuit with the reference level of said second reference level setting means and outputting a second gain control signal to said second gain control circuit so that said integration average value with said reference level can be identical with each other;

a first amplitude limiting circuit for limiting the respective upper and lower limits of said first gain control signal; and, a second amplitude limiting circuit for limiting the respective upper and lower limits of said second gain control signal.

* * * * *